G. A. KISSINGER.
COLD CHISEL.
APPLICATION FILED OCT 13, 1919.
1,343,323.
Patented June 15, 1920.
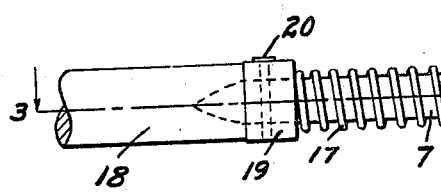
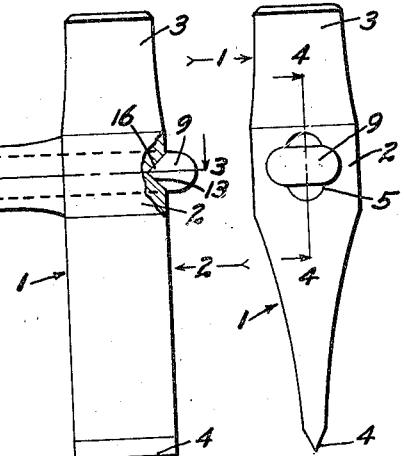
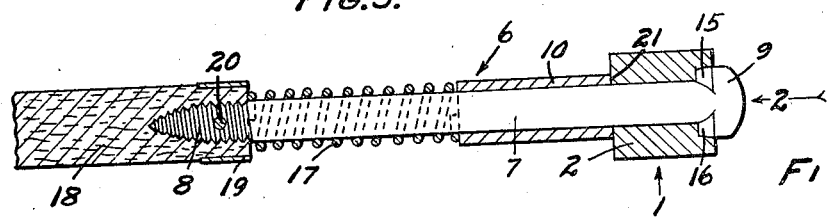
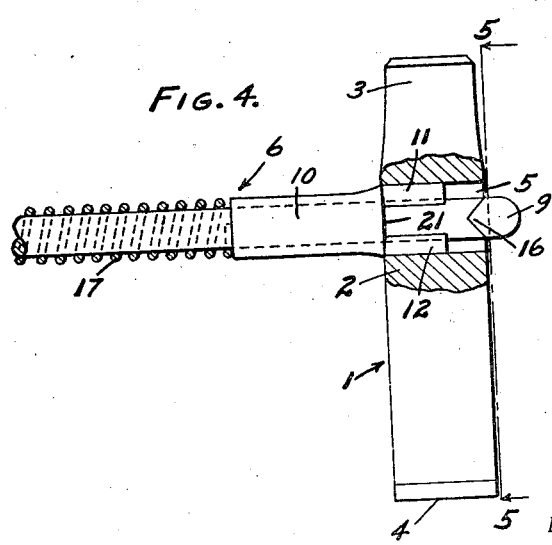
INVENTOR.
GEO. A. KISSINGER
BY
Hazard & Miller
ATTORNEYS.

UNITED STATES PATENT OFFICE.

GEORGE A. KISSINGER, OF SAN GABRIEL, CALIFORNIA.

COLD-CHISEL.

1,343,323. Specification of Letters Patent. Patented June 15, 1920.

Application filed October 13, 1919. Serial No. 330,462.

*To all whom it may concern:*

Be it known that I, GEORGE A. KISSINGER, a citizen of the United States, residing at San Gabriel, in the county of Los Angeles and State of California, have invented new and useful Improvements in Cold-Chisels, of which the following is a specification.

My object is to make a cold chisel, and my invention consists of the novel features herein shown, described and claimed.

Specifically an object of my invention is to make a cold chisel having a quick detachable yielding handle so as to form a shock absorber between the chisel and the handle and so that the chisel may be readily removed and a new chisel readily substituted.

Figure 1 is a side elevation of a cold chisel embodying the principles of my invention, parts being broken away and shown in section and the view being taken looking in the direction indicated by the arrows 1 in Figs. 2 and 3.

Fig. 2 is an end elevation looking in the direction indicated by the arrows 2 in Figs. 1 and 3.

Fig. 3 is a horizontal sectional detail on the line 3—3 of Fig. 1 and looking in the direction indicated by the arrows.

Fig. 4 is a sectional elevation on a plane parallel with Fig. 1 and on the line 4—4 of Fig. 2.

Fig. 5 is a cross sectional detail on the line 5—5 of Fig. 4 and looking in the direction indicated by the arrows.

The cold chisel bit 1 may be any of the usual constructions, except as hereinafter specified, having a body 2, a striking head 3 and a cutting edge 4 and there being a handle opening 5 through the body 2. The handle opening 5 is elongated up and down. The handle 6 is especially adapted to be readily applied to and removed from the bit 1 and is especially adapted to form a shock absorber between the bit and the operator holding the handle.

The round iron shank 7 has a screw 8 at one end and a cross head 9 at the other end. A ferrule 10 fits upon the shank 7 loosely so as to rotate and slide. Half bushings 11 and 12 extend from one end of the ferrule 10 and fit against the shank 7 diametrically opposite each other. The cross head 9 fits against the end faces of the bushings 11 and 12, when the handle is being inserted into or removed from the opening 5, so that the cross head 9 will pass through the opening 5, and so that the shank 7 and bushings 11 and 12 will fill the opening. After the bushings and shank have been inserted the shank is rotated a quarter turn and the cross head 9 extends crosswise of the opening 5 and will not pass through the opening.

Recesses 13 and 14 are formed in the front face of the head 2 diametrically and horizontally across the opening 5 and the cross head 9 has teeth 15 and 16 to fit in these recesses 13 and 14.

An expansive coil spring 17 fits upon the shank 7 against the ferrule 10. The screw-threaded end 8 of the shank 7 is screwed into the end of the hand grip 18 and the spring 17 fits against the end of the hand grip 18. A ferrule 19 is fixed upon the hand grip 18 and a pin 20 is inserted through the ferrule through the hand grip and through the screw-threaded end 8 to hold the parts securely together and to hold the shank 7 from unscrewing. A shoulder 21 is formed upon the ferrule 10 to hold the ferrule from passing into the opening 5.

When it is desired to remove the bit 1 from the handle, the bit 1 is rotated relative to the ferrule 10 a quarter turn and the cross head 9 is brought into line with the bushings 11 and 12 and will pass through the opening 5, and when a bit is to be applied to the handle the bushings 11 and 12 are pressed into the opening 5 until the bit strikes the shoulder 21 and continued pressure against the tension of the spring 17 will carry the cross head 9 through the opening 5, then the bit 1 is rotated relative to the ferrule 10 a quarter turn and released and the tension of the spring 17 will pull the teeth 15 and 16 into the recesses 13 and 14.

It is obvious that various changes might be made in the invention as herein set forth in its preferred form without departing from the spirit thereof as claimed.

I claim:

1. A cold chisel comprising a blade having an oblong hole for a handle, and a groove in the face of the blade positioned transversely of the oblong hole, a handle for the blade comprising a stem terminating in an oblong head adapted to slip through the oblong hole of the blade and having side lugs adapted to fit into the groove across the oblong hole and a handle portion fixed to the outer end of the stem and a coil spring positioned on the stem with one end bearing upon the blade and the other end bearing upon the handle portion.

2. A cold chisel comprising a blade having an oblong hole and a groove formed in one face of the blade transversely across the oblong hole, a stem terminating at one end in an oblong head adapted to slip through the oblong hole of the blade, the inner face of the head being formed to fit into the groove in the face of the blade, a sleeve slidably mounted upon the stem adapted to bear against the blade, a coil spring upon the stem bearing against the sleeve and a handle fixed to the outer end of the stem and bearing on the outer end of the spring.

3. A cold chisel comprising a blade having an oblong hole and a groove formed in the face of the blade transversely across the oblong hole, a handle comprising a stem terminating at its outer end in an oblong head, the inner face of which is formed to fit into the groove in the face of the blade, a sleeve slidably mounted upon said stem having projecting members forming bushings adapted to fill the oblong hole each side of the stem and having a shoulder adapted to bear against a face of the blade opposite to the face carrying the groove, a coil spring upon the stem against the sleeve and a handle portion fixed to the outer end of the stem against the outer end of the spring.

In testimony whereof I have signed my name to this specification.

G. A. KISSINGER.